United States Patent [19]

Shekleton

[11] 4,343,147

[45] Aug. 10, 1982

[54] COMBUSTORS AND COMBUSTION SYSTEMS

[75] Inventor: Jack R. Shekleton, San Diego, Calif.

[73] Assignee: Solar Turbines Incorporated, San Diego, Calif.

[21] Appl. No.: 128,199

[22] Filed: Mar. 7, 1980

[51] Int. Cl.³ .......................... F23R 3/20; F02C 7/22

[52] U.S. Cl. .................................... 60/39.06; 60/743; 60/744; 60/749

[58] Field of Search ................ 60/744, 745, 748, 743, 60/749, 737, 39.06

[56] References Cited

U.S. PATENT DOCUMENTS

| | | | |
|---|---|---|---|
| 2,560,866 | 7/1951 | Hoogendam . | |
| 2,938,345 | 5/1960 | Perle | 60/744 |
| 3,121,996 | 2/1964 | Smith | 60/748 |
| 3,933,133 | 1/1976 | Shekleton | 60/744 |
| 3,937,011 | 2/1976 | Carvel et al. | 60/748 |
| 3,972,182 | 8/1976 | Salvi | 60/743 |
| 4,008,039 | 2/1977 | Compton et al. | 60/744 |
| 4,062,182 | 12/1977 | Fehler et al. | 60/737 |
| 4,150,539 | 4/1979 | Rubins et al. | 60/749 |
| 4,222,243 | 9/1980 | Mobsby | 60/748 |

OTHER PUBLICATIONS

Sood et al., "Ongoing Development of a Low Emission Industrial Gas Turbine Combustion Chamber", Asme, Gas Turbine Conf., Mar. 12–15, 1979.

*Primary Examiner*—Robert E. Garrett
*Attorney, Agent, or Firm*—LeBlanc, Nolan, Shur & Nies

[57] ABSTRACT

Combustion systems which employ such features as rotary cup fuel atomizers and the latter in conjunction with CIVIC combustion to enhance flame performance, to produce efficient combustion over a wide operating range, and to eliminate the problems typically encountered in liquid fueled combustors, especially as they are scaled down in size. Innovations that can advantageously be employed in combustors operated on other fuels are also disclosed.

11 Claims, 6 Drawing Figures

COMBUSTORS AND COMBUSTION SYSTEMS

In one aspect the present invention relates to novel, improved, liquid-fueled combustors which nevertheless have features that can advantageously be used in combustors operating on other fuels.

In another aspect the invention relates to novel, improved combustor fuel supply systems with rotary cup atomizers.

And, from yet another point-of-view, my invention relates to novel, improved methods of effecting combustion in and with apparatus of the character identified above.

At present, the most important applications of my invention are thought to be in the gas turbine field and possibly in the furnace field; and the principles of that invention will accordingly be developed primarily by reference to such applications. This is for the sake of convenience, however, and is not intended to limit the scope of the appended claims.

It is difficult to obtain good combustion, reliably, and at reasonable cost, in small, liquid fuel combustors. This is because it is not possible, employing heretofore available techniques, to downscale fuel droplet size to match the combustor size.

Instead, atomization of liquid fuels at the low flows which small combustors employ ordinarily results in larger fuel droplets and lower efficiencies. Also, the smaller fuel passages involved increase the probability of plugging and generate higher fuel pressures, shortening the life of fuel pumps, for example, and increasing service costs.

I have now discovered that the foregoing, and other, drawbacks of small liquid fuel combustors can be avoided, and other advantages obtained, by employing a fuel supply system including a rotating cup atomizer of novel design, preferably in conjunction with CIVIC combustion and/or other features dealt with hereinafter.

The employment of a rotating cup atomizer in a small liquid fueled combustor is advantageous because it eliminates the small passages of typical liquid fuel supply systems, and the fuel pressure can be very low as it is needed only to effect flow to the combustor.

Fuel can be readily atomized into small droplets of controlled size even at extremely low flow rates, even if the fuel is highly viscous. This is important because of the increased range of fuels that can be employed and because it permits the combustor to operate efficiently even under Arctic and other cold weather conditions.

The use of rotary cup atomizers in liquid fueled combustors is not per se unique as is evidenced by the patents listed below. The novel features and consequent advantages of my invention discussed above and hereinafter, however, clearly distinguish my inventions from the devices disclosed in those patents, which are:

U.S. PATENTS

| U.S. Pat. No. | Patentee(s) | Issue Date |
|---|---|---|
| 540,650 | Eddy | 6/11/1895 |
| 548,647 | Mack | 10/29/1895 |
| 1,236,073 | Fesler | 8/07/1917 |
| 1,255,592 | Fesler | 2/05/1918 |
| 1,294,026 | Ballard | 2/11/1919 |
| 1,530,473 | Ballard | 3/24/1925 |
| 1,562,799 | Smith | 11/24/1925 |
| 1,672,064 | Holland | 6/05/1928 |
| 1,680,455 | Fesler et al | 8/14/1928 |
| 1,676,471 | Anderson et al | 7/10/1928 |
| 1,728,011 | Simmons et al | 9/10/1929 |
| 1,748,991 | Pierce | 3/04/1930 |
| 1,896,791 | Gilles | 2/07/1933 |
| 1,936,271 | Schroeder et al | 11/21/1933 |
| 1,996,336 | Gilles | 2/07/1933 |
| 2,200,826 | Johnson | 5/14/1940 |
| 2,204,170 | Zwilling | 6/11/1940 |
| 2,214,568 | Thomas | 9/10/1940 |
| 2,242,797 | Lucke | 5/20/1941 |
| 2,374,569 | Tramontini | 4/24/1945 |
| 2,474,020 | Van Den Bussche | 6/21/1949 |
| 2,501,736 | Olsen | 3/28/1950 |
| 2,560,866 | Hoogendam | 7/17/1951 |
| 2,602,292 | Buckland et al | 7/08/1952 |
| 2,705,401 | Allen et al | 4/05/1955 |
| 2,787,319 | Ryder | 4/02/1957 |
| 2,886,100 | Mros, Jr. | 5/12/1959 |
| 2,998,230 | Perretti | 8/29/1961 |
| 3,020,718 | Deacon et al | 2/13/1962 |
| 3,495,923 | Dyre | 2/17/1970 |
| 3,508,852 | Hourwitz et al | |
| 3,840,328 | Ashton | 10/08/1974 |
| 3,933,133 | Shekleton | 1/20/1976 |
| 4,008,039 | Compton et al | 2/15/1977 |
| 4,150,539 | Rubins et al | 4/24/1979 |

FOREIGN PATENTS

| Country | Patent No. | Date | Patentee |
|---|---|---|---|
| France | 1,188,845 | 3/16/59 (Delivre) | De Poray |
| Great Britain | 822,288 | 10/21/59 (Publication) | Techni-Com S.A. |

As heretofore employed with combustors of conventional design, however, rotary cup atomization has proved to be less than satisfactory. Problems that have resulted include flame instability, the generation of smoke and carbon, overheating of the atomizer, and inefficient combustion. Furthermore, such combustors have not met the requirement that they be capable of operating over the wide range of conditions exemplified by operation on a viscous, non-volatile fuel from cold start under Arctic conditions on the one hand and by operation on a volatile, non-viscous fuel at high temperature and altitude on the other.

These problems are considerably reduced in accord with the principles of the present invention and a satisfactorily wide operating range obtained by employing rotary cup atomization in conjunction with CIVIC combustion as mentioned above.

Such combustion, as is described in more detail in my copending application No. 128,360 filed Mar. 7, 1980, employs a "stratified charge" mechanism in that mode of operation which perhaps best illustrates its unique features and capabilities.

In the just identified mode of operating a CIVIC combustor employing rotary cup fuel atomization, a thin, uniform annulus of fuel droplets is formed at a very precise location exactly on the inner boundary of an axially moving annulus of combustion air which has theretofore been caused to swirl or rotate about the axis of the annulus.

As the stratified fuel-air charge moves toward the downstream end of the combustor, the atomized fuel is ignited by recirculating combustion products; and a small part of the fuel burns, vaporizing the rest of the fuel and forming a thin, stratified annulus of hot vaporized fuel surrounded by, and rotating with, the swirling annulus of combustion air. The centrifugal force of the swirling flow inhibits mixing of the hot vaporized fuel with the cooler combustion air, a most important feature of CIVIC combustion.

Subsequently, the annulus of combustion air undergoes a rapid outward expansion. This drastically reduces the centrifugal force of the swirl flow, producing rapid fuel-air mixing and efficient combustion of the fuel with a short flame.

Further downstream, the swirling gases are contracted inwardly by aerodynamic or mechanical constraint, and the flow annulus disappears; but the swirling flow of the gases continues. This, following the initial, outward expansion of the gases, generates inner and outer recirculation zones in which hot gases travel upstream and ignite the fuel-air mixture.

Initial, necessarily earlier than conventional, ignition is provided by the hot gases in the inner recirculation zone; they also furnish the main flame stabilizing mechanism. The gases recirculating in this zone have a forced vortex pattern and consequently have only a small radial force component. This is important in that the gases consequently do not disturb the wanted stratification between the cool swirl air (generally of the free vortex sort) and the hot vaporized fuel until the combustion zone is reached.

An important advantage of CIVIC combustion as just described is that the flame is shorter, more stable, and cooler than a flame typically obtained by burning a liquid fuel and is typically non-luminous and smoke-free. In fact, it resembles the pale blue flame heretofore generally obtained only by burning a gaseous fuel.

The lack of the aforementioned thin, stratified annulus of hot vaporized fuel results in a luminous smoky flame in heretofore proposed combustors. The smoke contaminates heat transfer surfaces and thus lowers the efficiency of heat transfer in furnace applications, for example.

A cooler flame is important as this results in cooler combustor walls, an advantage of self-evident importance.

Stratified charge operation as just described is also advantageous in that it can be employed in off-design conditions such as light-off where other fuel injection schemes are in some cases not practical because of inefficiency and lean flameout, for example.

Minimization of hot spots in the combustion zone is also an important attribute of CIVIC combustion. It is well-known that high $NO_x$ emissions can result if such hot spots exist even if the overall reaction temperature is kept low.

Other important advantages of CIVIC combustion as employed in the combustors described herein are that the combustors are simpler, easier to cool, and less expensive than those typically available and can be substituted for the latter without major redesign of combustor-associated components or systems.

Because of the superior flame stability and earlier ignition, much higher combustion air-to-fuel ratios can be employed in the CIVIC principle-employing combustors disclosed herein than is possible in conventional combustors. This is important as excess combustion air can be utilized to form a uniform, cool (lean) fuel-air mixture that, at least in gas turbine applications, will have emission levels in the range contemplated in proposed stringent standards yet also provide an extended low emission operating range.

Furthermore, employed as described herein, CIVIC combustion is advantageous because low emission operation over a much wider than conventional operating range is available without modification of the combustor.

The novel combustors disclosed herein also have advantageous features that are quite independent of CIVIC combustion. One is that incoming combustion air can be used essentially "cost free" in many instances to cool the combustor dome, to prevent the build-up of carbon deposits in marginal operating conditions, and to promote or assist atomization of the liquid fuel.

Also, as is typical, additional air may be needed to complete the combustion of the fuel and/or to dilute and cool the combustion products. The novel combustors disclosed herein feature techniques for introducing such additional air which eliminate the problems that introduction of such air typically generates; viz., lengthening of the flame; deteriorated flame stability resulting from entry of the additional air into the recirculating, flame stabilizing combustion products; and cooling problems resulting primarily from film air being stripped from the combustor walls by the dilution or combustion air jets.

To some extent, these problems are alleviated in a manner that has essentially across-the-board application by the use of a novel mechanical constraint which shortens the inner recirculation zone typical of swirl stabilized combustion. This advantageously shortens the combustor, prevents dilution air from penetrating to the recirculating zone, and guides that air into film cooling relationship with the downstream parts of the combustor.

Still other advantages of the novel combustors disclosed herein are attributable to: configurations which provide increased ignition time and therefore promote flame stability; the locating of an ignitor in manner which assures satisfactory ignition by carrying it out in a region of slowly moving gases; external convection cooling of the hotter, upstream portions of the combustor; and protection of the ignitor against overheating as temperatures in the combustor increase.

Yet another important advantage of the combustors in question is that, while emphasis has been placed on very small sizes, they can be upsized in routine fashion as circumstances dictate.

Another important characteristic which distinguishes the novel combustors disclosed herein from those of typical design, especially in furnace applications, is the use of a "strong swirl". This is a term in common usage in the combustor field, and it characterizes combustors in which there is a strongly expanded flow of air in the combustor and a large central zone of strongly recirculating combustion products. Typical furnace combustors, in contrast, are characterized by a "weak swirl". In them, the combustion air is only weakly expanded into the combustor; and the inner recirculation zone is small. Typically associated with weak swirl are such deficiencies as ineffective ignition and slow fuel evaporation which results in a very long smoky flame.

Still other advantages of the several inventions disclosed herein are attributable to the rotary cup atomizer itself and to that, and ancillary or related, fuel supply components. These advantages are universally available; i.e., they can be obtained irrespective of the type of combustor in which the rotary cup atomizer is employed.

One of the advantages in question is a novel configuration which maintains a reservoir of fuel in the rotating cup. The reservoir promotes uniform fuel filming, and this is important because a uniformly distributed film of fuel is an excellent coolant and keeps the cup from being overheated by hot gases in the inner recirculating zone. Uniformity of the fuel film is also important to flame stability and fuel atomization.

The reservoir also eliminates the minimum flow orifice typical in a gas turbine engine liquid fuel supply system along with the tendency to plugging and other attendant problems of such orifice. Specifically, when the load is removed from a gas turbine engine, the fuel flow must be rapidly reduced to prevent overspeed; and the just mentioned minimum flow orifice is provided in the typical fuel control for this purpose. The creation of the fuel reservoir in the cup in accord with the present invention makes this orifice unnecessary because sufficient fuel can be supplied from it to keep the flame burning even though the supply of fuel to the atomizer is briefly interrupted in the circumstances just described.

Another salient feature of the fuel supply and atomizing systems disclosed herein is a novel air buffer system which equalizes the pressure between the interior of the combustor and that on the upstream side of the fuel atomizer. This is important in that it keeps fuel from moving backward into the bearings of the rotary cup drive mechanism and consequently eliminates the deterioration which the association of fuel with the bearings causes. Further control over this backward movement of the fuel can be exercised by a novel seal arrangement I have developed for that purpose.

Another important feature of the novel rotary atomizers disclosed herein is that the fuel is delivered to the upstream end of the cup rather than being sprayed onto the cup at, or toward, its forward or downstream end as is conventional practice. This novel fuel delivery technique also promotes uniformity in fuel filming with the consequent advantages discussed above.

It will be apparent to the reader from the foregoing that one important object of the present invention resides in the provision of novel, improved, liquid fueled combustors.

Another important, related object of my invention resides in the provision of novel combustor features which can also advantageously be employed in combustors operating on other types of fuels including very viscous ones.

An additional important and primary object of my invention resides in the provision of very small combustors which are capable of operating efficiently and reliably over a wide range of climatic and load conditions and on a wide variety of liquid fuels.

Other important but more specific objects of my invention reside in the provision of combustors in accord with the preceding objects:

which have a novel means of fuel evaporation that provides a superior, short, stable, cool, smokeless, and non-luminous flame over a wide operating range on a variety of liquid fuels;

which are simple, inexpensive, and relatively easy to cool;

which have novel dilution and additional combustion air introduction systems that reduce, or eliminate, the flame luminosity and generation of smoke attributable to the manner in which such air is typically introduced into a combustor;

in which ignition on light-off is more reliable than is typically the case;

which are superior to typical combustors from the viewpoint of reduced emissions and which have a premix mode of operation in which emissions are further decreased;

in which combustion air can be employed at an essentially zero energy cost to cool those parts of the combustor which are most subject to overheating;

which exert a novel mechanical constraint on swirling burning gases that advantageously shortens the combustor;

which can be substituted for conventional combustors without major redesign of the systems in which they are employed;

which are versatile both in terms of the features discussed above and others relating to their construction and operation and in terms of the uses to which they can be put; and which have various combinations of the foregoing attributes.

Still another important and primary object of the present invention is the provision of novel, improved, rotary cup fuel supply and atomization systems for liquid fueled combustors.

Other important, more specific objects of my invention reside in the provision of rotary cup type fuel supply and atomizer systems:

which are capable of producing small fuel droplets, even at low fuel flows and from viscous fuels and under conditions involving low primary combustion air pressures;

which, especially where the small size of the combustor or other conditions dictate low fuel flows, eliminate the hardware typically employed for low fuel flows and its attendant problems;

which eliminate the problems appurtenant to typical combustors with rotary cup fuel atomization such as flame instability, the generation of smoke and carbon, overheating, inefficient combustion, and long flame;

in which the rotary cup of the atomizer has a novel configuration that maintains a reservoir of fuel and, consequentially, protects the atomizer against overheating and, also, keeps the flame burning even though the supply of fuel to the combustor is interrupted;

which are protected from fuel back-up and the deleterious effects this can cause;

in which the fuel is applied to the rotating atomizer cup in a manner that results in the formation of a more uniform film of fuel than is typical; and which have various combinations of the foregoing and other important attributes.

And another important, and primary, object of my invention is the provision of novel, improved methods of burning liquid fuels which provide various ones of the advantages discussed above.

Still other important objects and features and additional advantages of my invention will become apparent to the reader from the appended claims and as the ensuing detailed description and discussion proceeds in conjunction with the accompanying drawing, in which:

Those exemplary embodiments of my invention described in the detailed description which follows are to some extent alike. To the extent that this is true, identical reference characters will be employed to identify structural components, etc. which are alike.

Figure 1:
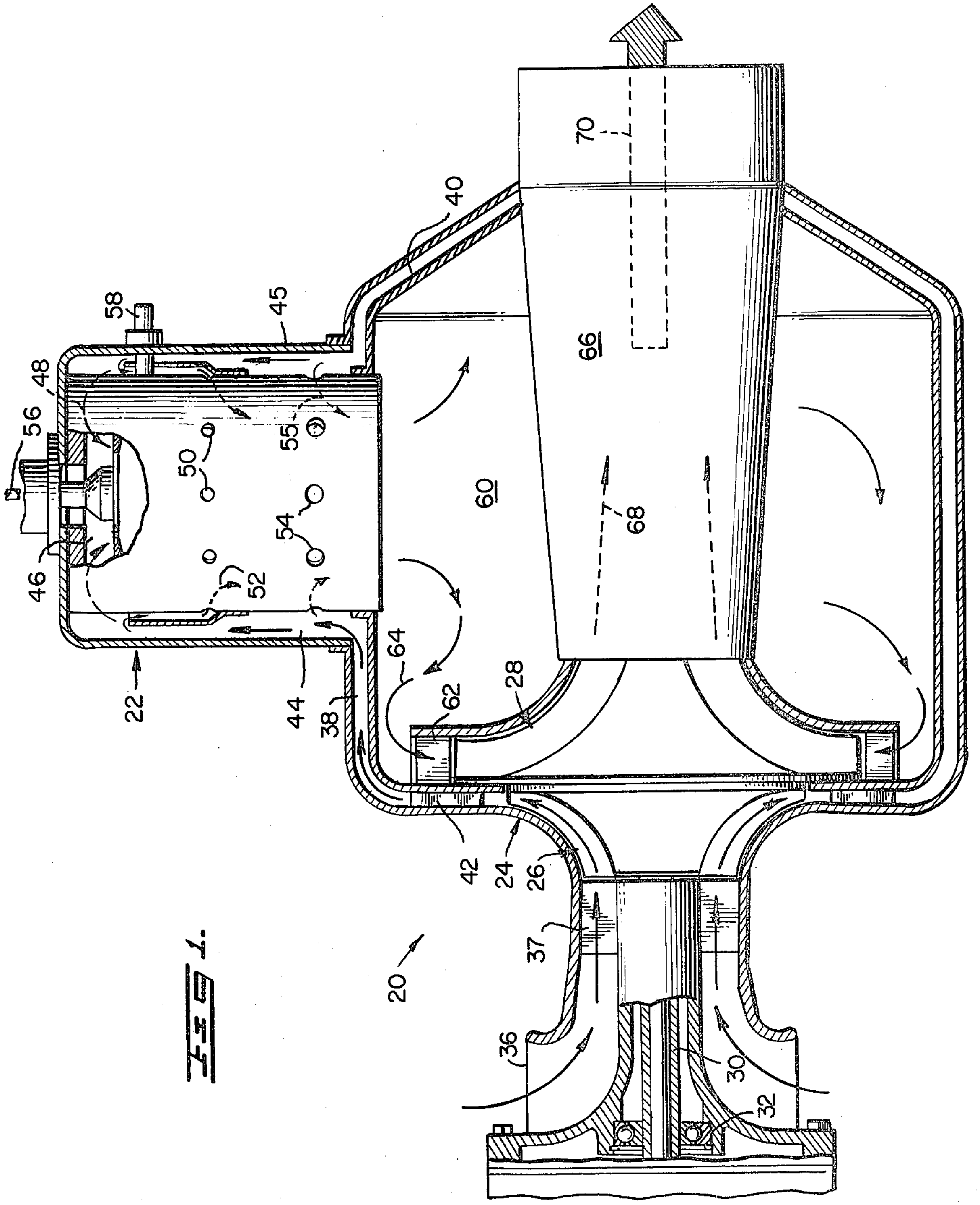
FIG. 1 is a longitudinal section through a gas turbine engine equipped with a combustor and combustion air and liquid fuel supplying and atomizing systems embodying the principles of the present invention.

Referring now to the drawing, FIG. 1 depicts a gas turbine engine 20 equipped with a combustor 22 constructed in accord with and embodying the principles of the present invention.

Engine 20 is a commerically available, Solar Turbines International Gemini. It will, accordingly, be described herein only to the extent necessary for an understanding of the present invention.

Engine 20 includes a casing 24 housing a single stage radial compressor 26 and a radial, single stage turbine 28 mounted in back-to-back relationship on a shaft 30. The compressor-turbine-shaft assembly is rotatably supported in casing 24 by bearings 32 (only one of which is shown).

Combustor 22 is supported from casing 24 on the downstream side of turbine 28.

Air enters casing 24 through an annular inlet 36 at its upstream end and flows in an axial direction past vanes 37 into compressor 26.

The compressor discharges the air through a passage 38 between casing 24 and an inner jacket 40 past diffuser vanes 42 into an annular passage 44 between combustor casing 24 and combustor jacket 45.

Part of this air flows into the main combustion air passage 46 of combustor 22 as indicated by arrows 48, and additional air is introduced into the combustor through secondary or dilution air ports 50 as indicated by arrows 52 to dilute the hot combusted gases to acceptable temperatures when air in more-or-less sufficient quantities for complete combustion is supplied through main passage 46. Where insufficient air for complete combustion is supplied through passage 46, additional air in an amount sufficient to complete combustion is supplied through air ports 50. Ordinarily, in this case, air is supplied through an additional set of air ports 54 further downwstream as indicated by arrows 55 to dilute the combustion products.

Air supplied through passage 46 and ports 50 and 54 is also employed to cool the combustor.

Fuel is supplied to the engine through line 56, and an ignitor 58 is provided to ignite the fuel at light-off.

Thereafter, the combustor operates as described above.

The hot gases generated in combustor 22 are discharged into an annular plenum 60 and flow from the plenum through nozzle ring 62 into turbine 28 to drive the latter as indicated by arrows 64.

Gases discharged from the turbine are exhausted through a manifold 66 as indicated by arrows 68 and 70.

By virtue of the foregoing, turbine 28 drives compressor 26 and, in addition, generates additional energy which is available at shaft 30.

Figure 2:
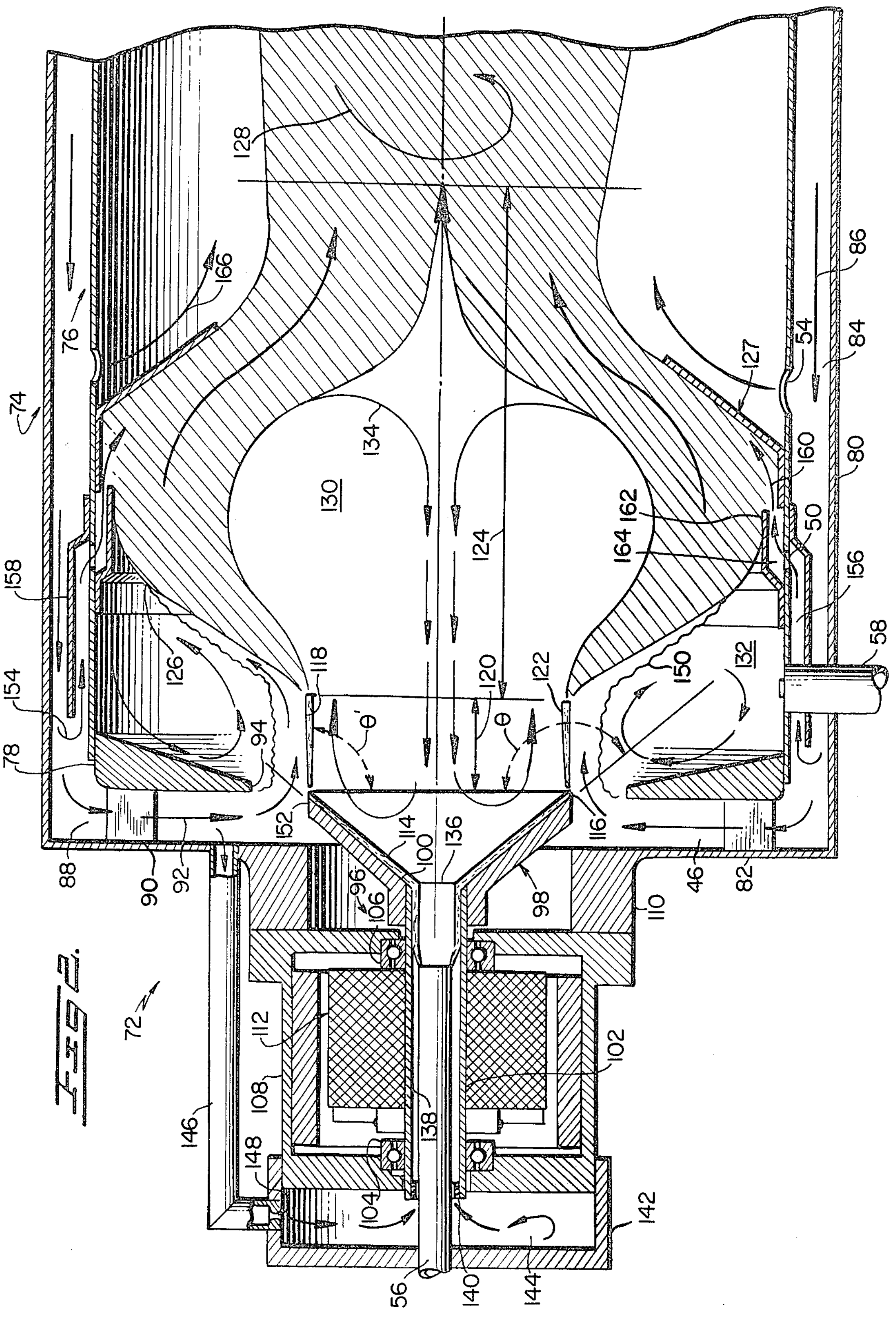
FIG. 2 is a longitudinal section through a second embodiment of my invention having a combustor, a combustion air supply system, and a fuel supply and atomizing system, all employing the principles of that invention.

FIG. 2 shows in more detail a combustor 72 which duplicates that illustrated in FIG. 1 except for structural differences.

Combustor 72 numbers, among its major components, a jacket or outer casing 74, an inner casing 76, and a dome 78.

Outer casing 74 has a longitudinally extending cylindrical section 80 with a transversely extending wall 82 at its upstream end.

Inner casing 76 is a cylindrical member supported in concentric relationship in the cylindrical section 80 of the outer casing.

Dome 78 is a circular component and is mounted in the upstream end of the inner casing. It cooperates with the upstream end wall 82 of outer casing 74 to form the radially inwardly extending, main combustion air passage 46 alluded to briefly above. In combustor 72, air reaches that passage from an axially extending, annular passage 84 between inner combustor casing 76 and the cylindrical section 80 of the outer casing as indicated by arrows 86 in FIG. 2.

Disposed in main combustion air passage 46 adjacent its inlet 88 and extending between outer casing end wall 82 and dome 78, is a set of radially oriented, generally equiangularly spaced, longitudinally extending swirl vanes 90. The latter impart a swirl, or rotational components, to combustion air introduced into passage 46 through inlet 88 and flowing therethrough as indicated by arrows 92.

The combustion air is discharged from passage 46 through a sharp edged orifice 94 in dome 78 in the form of a swirling, or rotating, axially moving annulus of combustion air.

Fuel supplied to combustor 72 through line 56 is discharged into a rotating cup type atomizer 96. The atomizer includes a cup 98 with a frustoconical inner face 100 facing the downstream end of the combustor and a hollow shaft 102 on which the cup is mounted.

Shaft 102 surrounds fuel line 56. It is rotatably supported by bearings 104 and 106 in a casing 108 secured to an annular flange or boss 110 on outer combustor casing end wall 82.

Shaft 102 and cup 98 are rotated, typically at about 12,000–13,000 rpm, by an electric motor 112.

While a speed in this particular range speed is not essential, it is most advantageous that the speed of the rotary atomizer cup 98 be high. This is a departure from typical practice which is characterized by what I consider an inadequately low speed of revolution and the consequential formation of large fuel droplets and the production of a smoky, luminous flame.

Fuel introduced into the combustor through line 56 is consequently spread into a thin, uniform film 114 on the inner face 100 of cup 98 and discharged from the periphery or downstream edge 116 of the latter at a location axially more or less coincident with orifice 94 as an annulus of fine droplets of controlled size when in normal operation.

The fuel supplied to the combustor is accordingly placed in atomized form on the inner boundary 118 of the swirling annulus of combustion air at a precisely determinable location.

Extending downstream from rotary cup 98 is a flame stratification zone 120 in which the atomized fuel in annulus 122 is vaporized by a hereinafter described mechanism which is peculiar to CIVIC combustors.

At the downstream end of flame stratification zone 120, the swirling or rotating stratified annuli of combustion air (at ca. 860° R. in a simple cycle gas turbine of 4:1 pressure ratio) and swirling vaporized fuel at ca. 3750° R. are rapidly expanded into a combustion zone 124 as indicated by streamline 126. This greatly reduces the centrifugal forces of the swirl flow as, for the typical free vortex air flow described above, such forces are an inverse function of the cube of the swirl flow radius.

The rapid reduction of the centrifugal, swirl air forces results in rapid mixing between the evaporated fuel and the combustion air. This is important in that it leads directly to efficient combustion and a short flame.

The swirling fuel-air mass expands outwardly as it moves downstream through the combustion zone to an extent limited by the downstream section of inner combustor casing 76. Further downstream, the swirling or rotating gases are caused to contract inwardly by an annular, frustoconical baffle 127 which tapers inwardly and toward the downstream end of the combustor and is secured in inner combustor casing 76.

The annulus of swirling, hot gases ceases to exist as such at the downstream end of the combustion zone 124 although the rotational swirl of the gases continues as indicated by arrow 128.

The aerodynamic flow mechanism just described results in the creation of an inner recirculation zone 130, which is the main flame stabilizing mechanism in combustor 72, and an annular, outer recirculation zone 132 which surrounds the swirling annulus of combustion air at the upstream end of the combustor. Hot gases flowing upstream in the inner recirculation zone 130 as indicated by arrows 134 ignite atomized fuel in flame stratification zone 120. However, because mixing of the hot fuel and the cooler combustion air surrounding it is strongly inhibited by centrifugal force effects, only a small percentage of this fuel can be burned in the flame stratification zone. This is a key to flame stability and non-luminous combustion.

Nevertheless, this limited combustion is sufficient to evaporate the remainder of the atomized fuel and raise it to a very high temperature because the latent heat of evaporation of a liquid fuel is on the order of only 130 BTU per pound while the heat of combustion is typically ca. 18,500 BTU per pound.

The just described, controlled evaporation of the fuel in flame stratification zone 120 is unique and most advantageous. In typical combustors, fuel evaporation is carried out in a random fashion; occurs in all areas of the main combustion zone; and is, consequentially, mainly responsible for such major drawbacks as the generation of smoke, flame instability, inefficient combustion, long flames, carbon build-up, hot walls, high emissions, etc.

The air supply arrangement just described also has the advantage that, without the expenditure of additional energy, the combustion air can be employed to keep the hot gases in outer recirculation zone 132 from overheating combustor dome 78 by virtue of the convective cooling afforded by the air as it flows through swirl passage 46.

Another advantage of the aerodynamic flow pattern just described is that the vigorously rotating or swirling annulus of combustion air most unexpectedly moves to the downstream end of flame stratification zone 120 before it expands to any considerable extent. This promotes the stratification wanted between the fuel and the combustion air in flame stratification zone 120 for maximum flame stability by way of an "aerodynamic wall" rather than a "mechanical wall".

Downstream from flame stratification zone 120, the bulk of the fuel burns in combustion zone 124. The combusted fuel-air mixture supplies the hot gases necessary for ignition to the inner recirculation zone 130 and to the outer recirculation zone 132.

The just described method of fuel injection, evaporation, and controlled stratification is of paramount importance because it results in excellent flame stability and a non-luminous, blue flame typically obtained only by burning gaseous fuels.

There are a number of important features of combustor 72 and its fuel supply system as thus far described which are not readily apparent from an inspection of FIG. 2.

One is the specific downstream location of ignitor 58 with respect to the periphery or discharge edge 116 of rotary cup atomizer 98. In gas turbine applications of my invention, the air supplied to the combustor at light-off will typically be flowing at a relatively low velocity because of slow compressor speed (zero to 30% of design speed).

As a consequence, the forces exerted on the atomized fuel by the primary combustion air will be relatively low; and the spray discharge angle (indicated by $\theta$ in FIG. 2) will be substantially greater than 90°.

Ignitor 58 is located so that its flame, glow, spark, etc. will intersect this spray of fuel to insure efficient ignition. Efficiency is furthermore promoted, in accord with the present invention, by insuring that light-off of the fuel occurs in outer recirculation zone 132. This is important because the gases in this zone circulate at relatively low velocity and, consequently, are not apt to disturb the ignition process.

As the compressor speed increases, so does the velocity of the combustor discharge air. This results in higher aerodynamic forces being exerted on the atomized fuel discharged from cup 98, reducing the discharge angle $\theta'$ to 90° and "bending" the annulus 122 of atomized fuel into the essentially cylindrical configuration shown in FIG. 2. This deflects the fuel away from ignitor 58, thereby protecting it against overheating during normal engine operation.

Another important feature of my invention, as depicted in FIG. 2, is that fuel supply line 56 is foreshortened so that the fuel flows through hollow shaft 102 onto rotating cup inner face 100 at its upper end or frustum 136 rather than being sprayed onto the cup as is conventional practice. The consequence of this novel technique of placing the fuel on the cup insures that a thin, uniform film 114 of fuel will be formed on face 100. As discussed above, this formation of a uniform film is important both in protecting the cup against overheating and in producing maximum flame stability.

In a rotary cup atomizer as shown in FIG. 2, fuel can back up through the passage (138 in FIG. 2) between the fuel supply line and the cup supporting shaft. This is disadvantageous because fuel can consequentially reach the bearings in which the shaft is supported; and the fuel has a definite deleterious effect on the bearings.

In combustor 72 this back up of the fuel is forestalled by installing a close tolerance seal 140 between the upstream end of shaft 102 and the fuel delivery line.

Fuel back up can be further optionally minimized by the air buffer arrangement shown in FIG. 2. This includes a cap 142 which cooperates with casing 108 to form a plenum 144 on the upstream side of atomizer shaft 102 and an air line or duct 146 connecting primary combustion air passage 46 with plenum 144 through a discharge orifice 148.

The arrangement just described more or less balances the pressure in plenum 144 with that in combustor 72. As a consequence, fuel is prevented from backing up through passage 138. At the same time, air is kept from flowing through the tube by the fore-going balancing of pressures aided by the resistance, due to surface tension, of the fuel film. This is important because, if air did flow through the tube, it would not only disrupt the fuel film but would enter inner recirculation zone 130 and produce such deleterious effects as flame instability, combustion smoke, etc.

Another important feature of combustor 72, alluded to briefly above, is the generation or creation of a "strong" swirl in the primary combustion air rather than a weak swirl as is the typical furnace practice. This is done by employing a swirl blade angle of about 40° or more. The strong swirl creates a strong recirculation flow in a short length inner recirculation zone as illustrated in FIG. 2 which results in a short, blue, non-luminous, and stable flame rather than the long, soot forming, luminous and unstable flame typically obtained when weak swirl is employed.

Another important advantage of combustor 72, obtained by use of a radial inflow air swirl and by discharging the swirling combustion air through a relatively sharp edged orifice (94 in dome 78), results from this forming a vena contracta as indicated by flow lines 150. This phenomenon, which is well-known to those familiar with fluid mechanics, causes the rotating annulus of combustion air to firmly attach to the outer rim 152 of rotary cup 98 and enhances fuel atomization. This contrasts markedly with the lack of firm attachment and the separation between the cup and the air flowing over it that occurs in a typical combustor with rotary cup atomization. That air flow separation does not occur is important because such separation makes it impossible to obtain the wanted, precise placement of the fuel on the inner boundary of the combustion air annulus and degrades fuel atomization.

Furthermore, such separation permits hot recirculating gases to flow through the separation zone and contact the atomizer. This can damage or even destroy atomizer components and cause the build up of gum and carbon on the atomizer cup. Gum and carbon build-ups are unwanted as they seriously affect the operation of the combustor, make frequent maintenance necessary, and make destructive fires a definite possibility.

In the stratified charge mode of operating combustor 72 under discussion, atomizer cup 98 is rotated in the opposite direction to the swirling, combustion air. This maximizes the relative velocity between the fuel and air, which promotes atomization of the fuel into the wanted small droplets of uniform, controlled size without excessive rotational speed.

Counterswirl is also the most effective in keeping the fuel from penetrating into either the inner recirculation zone 130 or the outer recirculation zone 132 of the combustor.

This counter or contrarotation also momentarily keeps the fuel from centrifuging (or moving radially outward) into the combustion air. As a consequence, the fuel is rapidly evaporated and heated because the hot gases generated by the limited, controlled combustion in flame stratification zone 120, being much lighter than the adjacent air and fuel, will move radially inwardly while the heavier fuel will centrifuge outwardly into the hot gases.

The result is the wanted rapid and thorough fuel evaporation and consequent clean, non-luminous, carbon and sootfree combustion of the fuel not obtained in typical practice.

Once evaporated and heated, the fuel is much lighter than the swirling combustion air lying adjacent to it. Consequently, because of the high centrifugal forces involved (typically on the order of 40,000 g and more), there is little tendency for the fuel to mix with the air until the downstream end of the flame stratification zone is reached and the fuel and air expanded outwardly along streamline 126. This lack of mixing in flame stratification zone 120 results in a flame which is much more stable than that typically obtained in turbine and furance combustors.

Another advantage of increased flame stability in the novel combustors I have disclosed herein is that this can allow all of the air necessary for combustion of the fuel, plus excess air, to be introduced through primary combustion air passage 46. This is important as the supply of (particularly excess) air in this manner results: in a very cool, nonluminous, and short flame which remains stable over a wide operating range; in the absence of smoke; and in a combustor having walls that remain cool. In short, the characteristics of a high quality, natural gas burning combustor are obtained with liquid fuels. This is most advantageous in terms of simplcity, reduced manufacturing costs, and long service life as well as for the other reasons discussed above.

In contrast, heretofore many attempts to supply excess combustion air, particularly in turbine applications where a wide operating range is required, have invariably failed because of the inadequate flame stability that results. This also generates such major problems as smoke, overheated combustor walls, and an attendant short service life. Inadequate flame stability also severely limits the operating range of the combustor in applications such as high altitude gas turbine engine operation, for example. In fact flame stability is such a problem that no more than ca. 10 percent of the combustion air can be supplied in primary swirl form in a typical turbine combustor.

Despite the foregoing, the provision of excess combustion air through primary swirl air passage 46 is not a requisite to the successful operation of combustor 72. For example, it is often preferable to supply a more nearly stoichiometric amount of air in that fashion when heavier, more viscous and difficult-to-burn fuels are being employed because higher flame temperatures can be reached to enhance fuel evaporation.

Furthermore, even a deficiency of air can be advantageously supplied through primary combustion air passage 46 in some circumstances—e.g., in burning fuels having a high content of fuel-bound nitrogen as this reduces the tendency toward the formation of noxious nitrogen oxides.

A particular advantage of combustor 72, in this regard, is that a clean, non-luminous, soot and carbon-free flame is obtained even when a deficiency of combustion air is supplied through passage 46. This is not a feature of typical practice.

Despite what has been discussed above, it is also by no means essential that counterswirl between the primary combustion air and the atomized fuel be employed. A coswirl can even be employed to advantage as can switching from counterswirl to coswirl, especially in larger combustors.

Specifically, rotation of the atomizer cup in the same direction as the swirling air allows the atomized fuel to move out in a more radial direction and enter the swirling annulus of combustion air. This results in the formation, in stratification zone 120, of a more premixed charge that may be either fuel lean, or fuel rich, depending upon the amount of air supplied through passage 46. Premix operation, in which the combustible mixture is ignitied by hot gases in outer recirculation zone 132, demonstrably lowers $NO_x$ generation although at the expense of reduced flame stability.

Because of the uniquely high rotational speed of the fuel atomizer in combustors embodying the principles of the present invention and the consequent formation of small fuel droplets, the fuel droplets do not have sufficient mass to centrifuge through the outer recirculation zone in the combustor. Consequently, even in this mode of operation my novel combustors are free of the carbon, soot, luminosity, and overheated combustor walls typical of other liquid fueled combustors.

Also, coswirl produces superior light-off conditions when an aerodynamic wall, formed by the radial inflow air swirl and vena contracta effect discussed above, is present (with this "aerodynamic wall" replaced with a "mechanical wall" superior light-off conditions are obtained by employing couterswirl).

The superior light-off conditions that exist when coswirl is employed and the "aerodynamic wall" is present are attributable to the lowered relative velocity between the fuel droplets and the combustion air. This results in increases in fuel droplet size and of spray angle $\theta$, and the larger droplets centrifuge out into the combustion air more rapidly and therefore provide a mixture which is easily ignited by ignitor 58 at higher light-off speeds.

I pointed out previously that the use of coswirl is not favored in very small combustors. This is because it is difficult to keep fuel from entering the outer recirculation zone 132 and creating smoke and carbon. This problem disappears, however, as the size of the combustor is increased. Consequently, outer recirculation zone 132 can often be deleted in larger combustors.

As indicated above, additional air needed to complete the combustion processes or to dilute the combustion products to an appropriate temperature can be supplied to the interior of combustor 72 through dilution air ports 50.

More particularly, as suggested by arrows 86, this air is cuased to flow upstream through annular passage 84 like that supplied through radial swirl passage 46. The secondary, or dilution, air then flows, as indicated by arrows 154, into an annular passage 156 surrounding the upstream part of inner combustor casing 76. Passage 156 is formed by the cooperation between casing 76 and an annular air flow guide 158 which surrounds the inner casing and is fixed to the latter on the downstream side of the secondary air ports.

The arrangement just described is important, and contrary to conventional practice, in that it results in convection cooling of those portions of the inner casing which are most subject to overheating. This eliminates the film cooling which would be employed in typical practice. Film cooling of the upstream part of the inner casing is of course undesirable as this would result in air entering outer recirculation zone 132 and degrading flame performance.

As the secondary air flows into the combustor, it is directed along the swirl flow contracting baffle or deflector 127 as indicated by arrows 160 by an annular flow guide 162. This component abuts the inner combustor casing on the upstream side of the dilution air ports and cooperates with the latter to form an annular flow passage 164 opening onto the interior of the combustor at its downstream end. Consequently, in addition to performing the functions described above, the air introduced through secondary ports 50 provides film cooling of deflector 127 and keeps it from overheating.

In contrast, in conventional practice the dilution air jets typically strip film cooling air from the combustor walls and, downstream of their entry points, act as flame holders and cause heating of the combustor walls.

The directing of the secondary air into the combustor in the manner just described in the pattern shown in FIG. 2 also further guarantees that the dilution air will not penetrate to inner recirculation zone 130 to degrade flame performance. As discussed above, this isolation of the secondary air from the inner recirculation zone of a swirl stabilized combustor is unique and in part responsible for the superior performance obtained in combustors employing the principles of the present invention.

Ports 54 for additional, tertiary air are also illustrated in FIG. 2. Air is, again, supplied to the interior of the combustor through these ports from annular flow passage 84.

As indicated by arrows 166, baffle or deflector 127 performs an additional important function with respect to the tertiary air in that it deflects that air away from, and keeps it from entering, inner recirculation zone 130.

One typical combustor as just described and employed in a gas turbine engine driving a 10 KW generator is approximately 3.25 inches in diameter and 5.5 inches long. The rotating cup 98 of the atomizer is 0.78 inch in diameter and rotates at 12,000 rpm; and the combustion air gap around the cup is approximately 0.125 inch. The fuel flow ranges from as low as one kilogram per hour at light-off to 10.43 kg/hr at full load.

Many modifications may of course be made in combustors of the character illustrated in FIG. 2 without exceeding the scope of my invention.

For example, the inner casing can be configured upstream to match streamline 126, thereby eliminating outer recirculating zone 132. This can reduce cooling problems in appropriate circumstances as is discussed in my copending application No. 128,360.

Figure 3:
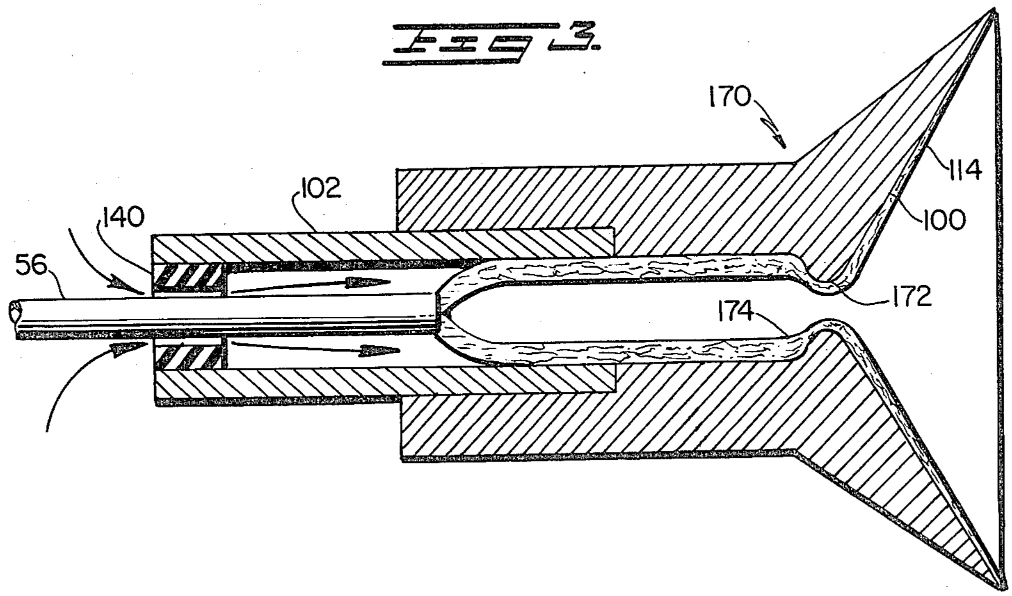
FIG. 3 is a longitudinal section through another form of rotating cup atomizer in accord with the principles of the present invention.

Another, important modification involves the substitution of a rotary atomizer cup of the character shown in FIG. 3 and identified by reference character 170 for the cup 98 illustrated in FIG. 2.

Atomizer cup 170 differs from cup 98 by virture of an inwardly extending, lip or dam 172 at the frustum or upstream end of its inner cup face 100.

This dam maintains a reservoir 174 of fuel in the atomizer cup. As discussed above, this is important because it contributes to the uniformity of fuel film 114 and because it makes fuel available during transient conditions, eliminating the small, trouble prone, minimum flow orifice otherwise required to keep fuel flowing to the atomizer.

Figure 4:
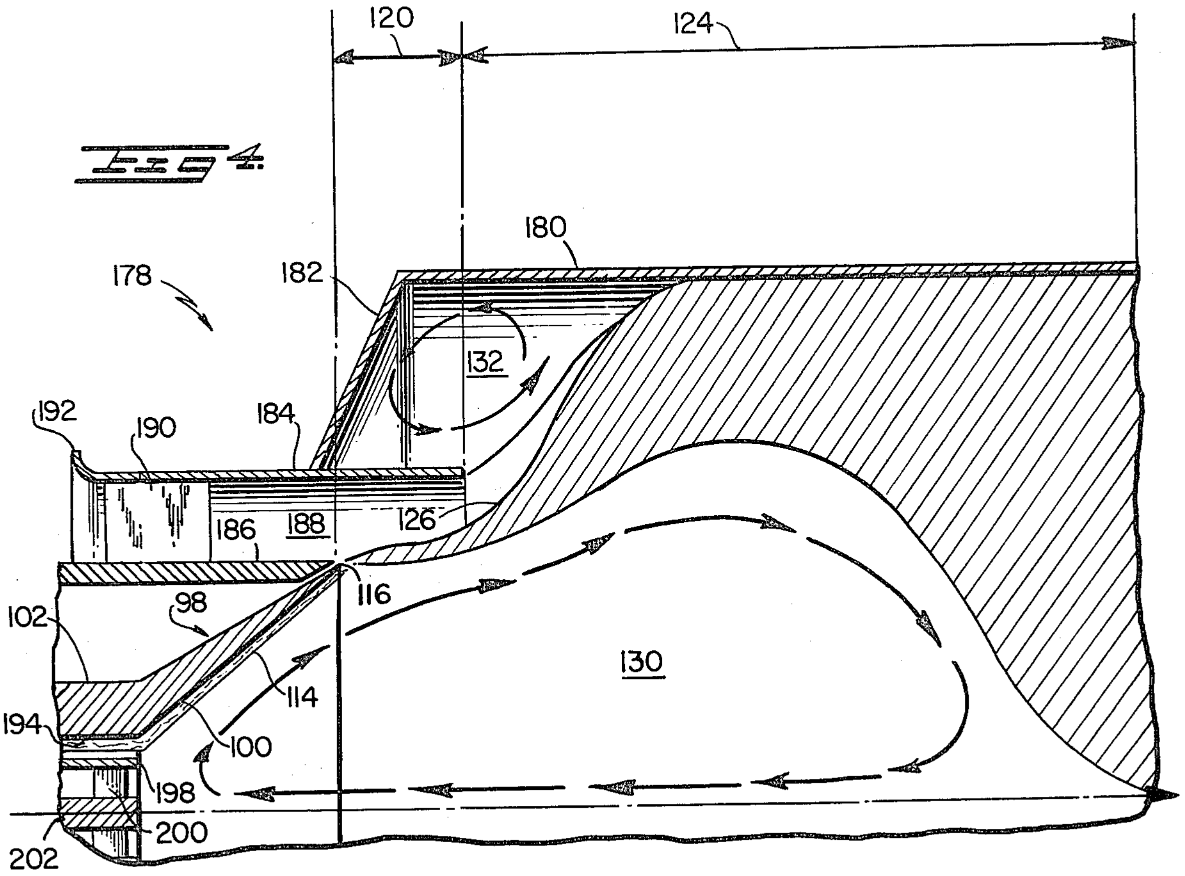
FIG. 4 is a fragmentary longitudinal section through yet another system utilizing a combustor, a combustion air supply arrangement, and a rotating cup fuel supply and atomizing arrangement embodying the principles of my invention.

FIG. 4, which is included to further illustrate the representative variations in design that may be made within the scope of the present invention, illustrates a combustor 178 which differs from combustor 72 in a conceptual sense primarily in that axial rather than radial swirl of the primary combustion air is employed, in that a mechanical constraint is therefore necessarily substituted for the "aerodynamic wall" employed in combustor 72 to insure fuel-air stratification until the fuel is evaporated and heated, and by provision for assist air to control fuel premix.

Combustor 178 has a cylindrical, outer housing or casing 180 terminating in an inclined, radially inwardly extending dome 182 at its upstream end. A tubular, primary swirl air duct 184 extends through dome 182 to the combustion zone 124 of the combustor.

Cylindrical sleeve 186, housed within duct 184, cooperates with the latter to form an annular, axially extending main combustion swirl air flow passage 188. Swirl vanes 190 are disposed in this passage adjacent the inlet 192 at its upstream end.

Rotary fuel atomizer cup 98 is housed in sleeve 186 with its downstream, fuel discharging edge 116 at the upstream edge of flame stratification zone 120. Fuel is supplied to the cup in a manner akin to that discussed above through an annular passage 194 between hollow atomizer cup shaft 102 and an assist air duct 198 extending therethrough.

An annular array of swirl vanes 200 is located at the discharge or downstream end of duct 198. The vanes are radially oriented and extend between the duct and a solid, cylindrically sectioned member 202 in the center of the duct.

Combustor 178 operates in much the same manner as combustor 72. Air enters axially extending, annular flow passage 188 through inlet 192 and is formed into a swirling, rotating annulus by swirl vanes 190. A rotating annulus of atomized fuel is precisely placed on the inner boundary of the annulus at the upstream end of flame stratification zone 120 by the rotating cup 98 of the fuel atomizer.

Thereafter, matters proceed in much the same manner as discussed above except that the rotating annuli of combustion air and fuel are momentarily kept from expanding over the length of flame stratification zone 120 for the purposes discussed above by the downstream section of duct 184 rather than by the "aerodynamic wall" or aerodynamic or fluid flow phenomena which results from a radial inflow swirl.

Also, as indicated above, air can be supplied through duct 198 to assist in the control of the liquid fuel combustion, if desired.

Typically, the swirl vanes 200 is duct 198 will be oriented to impart to the assist air a rotational component in the same direction as that imparted to the combustion air in passage 188 by swirl vanes 190 for the reasons discussed in my copending application No. 128,360. As discussed in that application, however, it is not necessary that that direction of swirl, or indeed any swirl at all, be employed.

A final noteworthy feature of combustor 178 is that the recirculating hot gases in outer recirculation zone 132 heat that part of duct 184 spanning flame stratification zone 120. This prevents fuel, inadvertently centrifuging out through the annulus of combustion air as a consequence of inadequate stratification resulting from marginal conditions of operation, from building up gum or carbon deposits on structural components of the combustor. At the same time, the combustion air flowing through duct 184 keeps it from being overheated.

For the sake of brevity, certain components which combustor 178 might have in actual practice have not been shown. For example, it might have a flow contracting baffle such as that identified by reference character 127 in FIG. 2 and the secondary and tertiary air supply arrangements shown in that figure.

Figure 5:
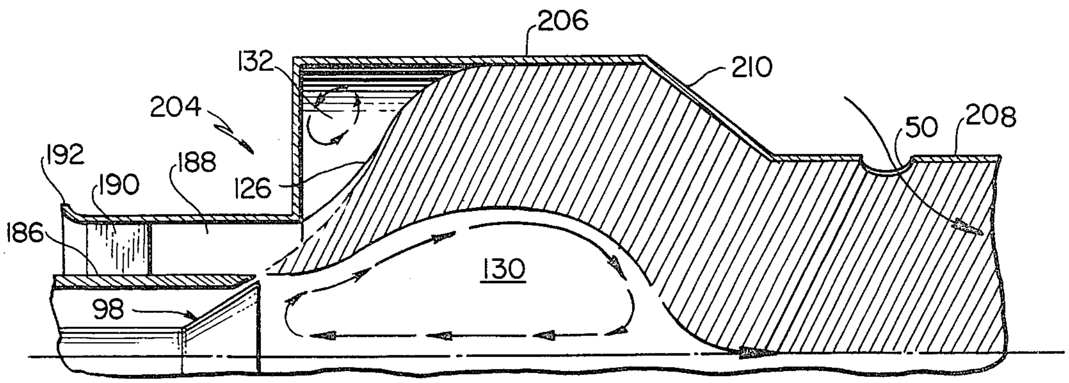
FIGS. 5 and 6 are views similar to FIG. 4 of two additional embodiments of my invention.

FIG. 5 shows a combustor 204 with yet another representative innovation that may be employed in either radial swirl or axial swirl combustors embodying the principles of the present invention (components of the combustors which are not essential to an understanding of the modification in question have again been eliminated for the sake of brevity).

Combustor 204 differs from combustor 178 primarily in that its casing has a relatively large diameter upstream section 206 and a smaller diameter downstream section 208. These combustor casing sections are connected, at a location upstream from tertiary air ports 54, by an inwardly and axially tapering transiting section 210 of the same configuration as the baffle 127 of combustor 72. This makes the baffle unnecessary as the casing itself serves the same functions as the latter. It contracts the swirling mass of burning gases and prevents the additional air from entering hot gas recirculation zones 130 and 132.

As pointed out above, combustors in accord with the principles of the present invention can be switched from a stratified charge mode of operation to a more premixed, low emmission mode by reversing the direction of rotation of atomizer cup 98. In actual practice, this can prove inconvenient and, in certain cases, ineffective. The assist air arrangement just described overcomes this inconvenience or ineffectiveness although at the expense of additional complexity and decreased flame stability. Specifically, the combustor can be switched from the stratified charge mode of operation to the premix, low emission mode by introducing air through duct 198 in coswirl relationship to the main combustion air (preferably with the cup rotation in the same direction but even though the cup continues to rotate in the opposite direction of the latter).

Thus, even with cup rotation in the same direction as the main air swirl, in conditions favoring rapid ignition and consequent stratification such as when using very volatile fuels, the addition of this air delays fuel ignition and hences enhances premix of the fuel with the combustion air to provide reduced NOx at a price of reduced flame stability.

Figure 6:
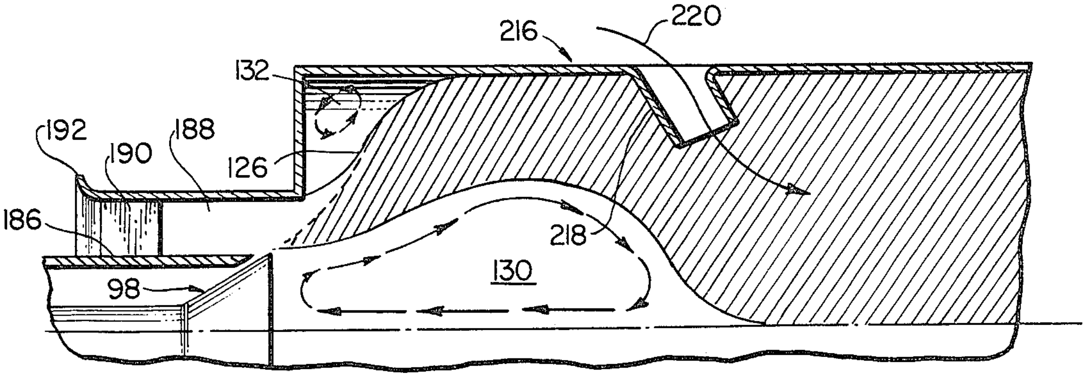

One final representative combustor employing the principles of my invention is shown in FIG. 6.

The combustor 216 depicted in that figure differs from those described above in that additional air is introduced into the interior of the combustor for the purposes discussed previously through an annular array of plunge tubes 218. These communicate with annular air flow passage 84 and are inclined toward the downstream end of the combustor into which they extend. This arrangement keeps the air thus introduced as shown by arrows 220 from penetrating into inner recirculating zone 130 and outer recirculation zone 132. In contrast to the baffle and specially configured combustor casing employed for this purpose in combustors 72 and 204, however, the plunge tube arrangement is not capable of contracting the swirling, burning, fuel-air mass or of consequently shortening the inner recirculation zone and the combustor.

The foregoing text and the accompanying drawings will suggest many other modifications of my invention to those conversant with the relevant arts. To the extend that they are not expressly excluded, those and other applications of the invention's principles are fully intended to be encompassed within the scope of the appended claims.

The inention may be embodied in other specific forms without departing from the spirit or essential characteristics thereof. The present embodiments are therefore to be considered in all respects as illustrative and not restrictive, the scope of the invention being indicated by the appended claim rather than by the foregoing description; and all changes which come within the meaning and range of equivalency of the claims are therefore intended to be embraced therein.

I claim:

1. A method of effecting the stable, nonluminous combustion of a liquid fuel which comprises the steps of: generating an annulus of axially moving, rotating combustion air; forming the liquid fuel being burned into a thin, uniform, annular, stratified, atomized film of fuel on the inner boundary of said combustion air annulus at a specified location therealong; vaporizing said atomized fuel while it remains in said stratified film; and thereafter rapidly expanding said annuli of combustion air and vaporized fuel and then so effecting a downstream contraction of the fuel-air mass by way of a mechanical or aerodynamic constraint as to promote the mixing and subsequent combustion of said vaporized fuel and air and the formation of a recirculation zone containing hot gases which stabilize the flame generated by the combustion of the fuel and air and effect said vaporizing of the stratified atomized fuel and the heating of the vaporized fuel before said vaporized fuel is mixed with the combustion air.

2. A method as defined in claim 1 wherein the combustor in which said method is carried out has a longitudinally extending casing member surrounding and bounding the swirling fuel-air mass and wherein said mechanical constraint is furnished by tapering said casing at a downstream location toward the axial centerline and downstream end thereof.

3. The method as defined in claim 1 in which said combustion air annulus contains at least the stoichiometric amount of air needed for the combustion of the fuel.

4. A method of effecting the stable, non-luminous combustion of a liquid fuel which comprises the steps of: generating an annulus of axially moving, rotating combustion air; forming a thin, uniform, stratified, annular film of atomized fuel on the inner boundary of said annulus at a specified location therealong by employment of a rotating cup-type atomizer; constraining said annulus against expansion for a period sufficient to effect the evaporation of said fuel while it remains stratified from said air; thereafter expanding the air in said annulus and then effecting a downstream contraction of the fuel-air mass to promote the mixing and subsequent combustion of said evaporated fuel and said air and the formation of a recirculation zone containing hot gases which stabilize the flame generated by the combustion of the fuel and air and to so ignite the fuel as to effect said evaporation of the atomized fuel and the subsequent heating of the vaporized fuel before the vaporized fuel is mixed with the combustion air, said cup being rotated in the opposite direction to the direction of rotation of the rotating combustion air to promote the aforesaid stratification between said fuel and said air during the evaporation of the fuel, thereby assuring the ignition of the fuel in a manner that maximizes the stability of the resulting flame.

5. The combination of a combustor, means for supplying combustion air thereto, said combustor including an elongated cylindrical casing having an inwardly extending dome at the upstream end thereof; the means for supplying combustion air to said combustor comprising means cooperating with said combustor dome to form a radially directed annular air passage communicating at the inner end thereof with the interior of said casing, means for imparting a rotational component to air flowing through said for imparting a rotational component to air flowing through said passage, and means for forming said air into a rotating, axially moving annulus; said liquid fuel supplying means comprising a cup-type fuel atomizer for forming a thin, annular, stratified film of fuel droplets of controlled size on the inner boundary of said rotating annulus of combustion air, shaft means supporting said atomized in said combustor at the upstream end thereof for rotation about an axis generally coincident with the longitudinal axis of the combustor, means for rotating said shaft and said atomizer, and means for delivering said fuel through said shaft to said atomizer; and said combustor further comprising means including a portion of said casing downstream of said dome into which said annulus of combustion air can expand for reducing the centrifugal forces on, and promoting, the mixing and subsequent combustion of said fuel and air and the formation of a recirculation zone containing hot gases which stabilize the flame generated by the combustion of the fuel air and ignite said fuel while it is stratified from the combustion air to first vaporize the atomized fuel and then heat the vaporized fuel.

6. The combination of claim 5 wherein said cup-type fuel atomizer comprises a cup having a frustonconical inner face, said shaft means supporting said cup for rotation about the axis generally coincident with the longitudinal axis of the combustor, said combustor also comprising means for rotating said shaft means and cup, and the means for delivering said liquid fuel to said atomizer terminating at the frustum of the inner face of said cup to therby promote the formation of a uniform film of atomized fuel on the inner surface of the atomizer, consequentially enhancing flame stability and protecting said atomizer against overheating.

7. In combination: a combustor, means for supplying fuel to said combustor comprising a cup-type fuel atomizer having a frustoconical inner face facing the downstream end of the combustor, an internal fuel supply passage communicating at its downstream end with the frustum of said cup, and means for rotating said cup to spread the fuel supplied through said passage into a film on the inner face of the cup and to eject the fuel from the edge of said face as a rotating annulus composed of droplets of controlled size; means for generating an annulus of axially moving, rotating combustion air in said combustor which surrounds and rotates in the same direction as the annulus of fuel discharged from said atomizer to thereby produce a stratified charge mode of operation; and means which can be selectively activated to concurrently supply an annular stream of air at the inner boundary of the fuel annulus which rotates in the same direction as the combustion air and the cup to thereby drive the combustor into a low emission mode of operation.

8. In combination: a combustor comprising an elongated cylindrical casing; means for introducing combustion air into the upstream end of said casing and for imparting a rotational component to said air to generate a rotating, axially moving annulus of combustion air in said casing; means for supplying fuel to said combustor and for forming the fuel into a thin, stratified, annular film of atomized fuel on, and attached to, the inner boundary of said rotating annulus of combustion air; said combustor further comprising means including a portion of said casing downstream of the location at which said atomized annulus of fuel is formed into which said annuli of combustion air and fuel can expand to reduce the centrifugal forces on, and promote the mixing and subsequent combustion of, said fuel and air and the formation of a recirculation zone containing hot gases which stabilize the flame generated by the combustion of the fuel and air and so ignite the fuel as to effect evaporation and heating of the fuel before if is mixed with the combustion air; means at a location downstream of said recirculation zone for introducing additional air into said combustor to complete the combustion of said fuel and/or to dilute the combustion products; and means for keeping said additional air from reaching said recirculation zone.

9. A combustor as defined in claim 8 wherein the means for introducing said additional air into said combustor comprises an annular array of ports in said casing, said casing being inclined inwardly and toward the downstream end thereof from a location upstream of said ports to a location nearer the axial centerline of the combustor than the ports to deflect said additional air away from said recirculation zone and to contract the outer boundary of the annulus of burning gases toward the centerline of the combustor and thereby shorten said recirculation zone and reduce the length of the combustor.

10. The combination of: a combustor, means for supplying fuel to said combustor, and means for supplying combustion air thereto, said combustor including an elongated cylindrical casing, a dome at the upstream end of said casing, and a jacket surrounding said casing, said jacket having a cylindrical portion spaced concentrically about the casing and an end wall spaced upstream from said dome, said jacket and said casing providing therebetween an axially extending, annular passage and an inwardly extending annular passage which is bounded by said casing dome and said jacket end wall and which communicates at its outer periphery with said axially extending passage; the means for supplying fuel to the combustor including means for forming an annular film of atomized fuel in said combustor and at the upstream end thereof; and the means for supplying combustion air to said combustor comprising means for effecting a flow of combustion air through said axially extending passage to the upstream end thereof and then through said radially inwardly extending passage to convection cool said dome and into the interior of said combustor in the form of a swirling or rotating, axially moving annulus around and in stratified relation to said annulus of atomized fuel; and said combustor including means comprising a section of said casing downstream of said dome into which said annuli of combustion air and fuel can expand for reducing the centrifugal forces on, and promoting, the mixing and subsequent combustion of said atomized fuel and air in a combustion zone located downstream from said dome and the formation of a recirculation zone upstream from said combustion zone containing hot gases which stabilize the flame generated by the combustion of the fuel and air and ignite said fuel before it is mixed with said combustion air by the reduction of the centrifugal forces on the annuli of fuel and combustion air as aforesaid to first vaporize the atomized fuel and then heat the vaporized fuel.

11. A method of effecting the stable non-luminous combustion of a liquid fuel which comprises the steps of: generating an annulus of axially moving, rotating combustion air; forming a thin, uniform, stratified, annular film of atomized fuel on the inner boundary of said annulus at a specified location therealong by employment of a rotating cup type atomizer; mechanically constraining said annulus against expansion for a period sufficient to effect the evaporation of said fuel; thereafter expanding the air in said annulus and then effecting a downstream contraction of the fuel-air mass to promote the mixing and subsequent combustion of said fuel and air and the formation of a recirculation zone containing hot gases which stabilize the flame generated by the combustion of the fuel and air and so ignite the fuel as to effect evaporation of the atomized fuel and heating of the evaporated fuel before the fuel is mixed with the combustion air.

* * * * *

UNITED STATES PATENT AND TRADEMARK OFFICE

CERTIFICATE OF CORRECTION

PATENT NO. : 4,343,147

DATED : August 10, 1982

INVENTOR(S) : JACK R. SHEKLETON

It is certified that error appears in the above-identified patent and that said Letters Patent is hereby corrected as shown below:

Column 2, line 21, after "Hourwitz et al" should be --4/28/1970--.

Column 8, line 27, change "nents" to --nent--.

Column 12, line 5, change "sootfree" to --soot-free--.

Column 13, line 11, change "ignitied" to --ignited--.

Column 13, line 51, "cuased" should be --caused--.

Column 16, line 15, change "transiting" to --transition--.

Column 17, line 13, change "nonluminous" to --non-luminous--.

Column 18, line 2, after "ing" and before "combustion" insert --liquid fuel to said combustor, and means for supplying--.

Column 17, line 39, change "The method" to --A method--.

Column 18, line 17, change "atomized" to --atomizer--.

Signed and Sealed this

*Twenty-second* Day of *March 1983*

[SEAL]

*Attest:*

GERALD J. MOSSINGHOFF

*Attesting Officer* *Commissioner of Patents and Trademarks*